United States Patent
Ben Ezra et al.

(10) Patent No.: US 10,735,439 B2
(45) Date of Patent: Aug. 4, 2020

(54) SYSTEM AND METHOD FOR ATTACK SEQUENCE MATCHING

(71) Applicant: RADWARE, LTD., Tel Aviv (IL)

(72) Inventors: Yotam Ben Ezra, Raanana (IL); Mor Krispil, Petah Tikva (IL)

(73) Assignee: Radware, Ltd., Tel Aviv (IL)

( * ) Notice: Subject to any disclaimer, the term of this patent is extended or adjusted under 35 U.S.C. 154(b) by 117 days.

(21) Appl. No.: 15/692,676

(22) Filed: Aug. 31, 2017

(65) Prior Publication Data
US 2018/0069875 A1    Mar. 8, 2018

Related U.S. Application Data

(60) Provisional application No. 62/383,837, filed on Sep. 6, 2016, provisional application No. 62/428,161, filed on Nov. 30, 2016.

(51) Int. Cl.
*H04L 29/06* (2006.01)

(52) U.S. Cl.
CPC ...... *H04L 63/1416* (2013.01); *H04L 63/1433* (2013.01); *H04L 63/1441* (2013.01)

(58) Field of Classification Search
CPC ...... G06F 21/55; G06F 21/554; G06F 21/566; G06N 20/00; G06N 5/04; H04L 63/1408; H04L 63/1416; H04L 63/1433; H04L 63/1441
See application file for complete search history.

(56) References Cited

U.S. PATENT DOCUMENTS

| | | |
|---|---|---|
| 7,181,768 B1 | 2/2007 | Ghosh et al. |
| 7,847,682 B2 | 12/2010 | Jung et al. |
| 2006/0123480 A1 | 6/2006 | Oh et al. |
| 2008/0148404 A1 | 6/2008 | Denton |
| 2013/0227687 A1 | 8/2013 | Lee |
| 2013/0305371 A1* | 11/2013 | Figlin ............... H04L 63/1408 726/23 |
| 2014/0230062 A1* | 8/2014 | Kumaran ............ G06F 21/554 726/24 |
| 2015/0215329 A1 | 7/2015 | Singla et al. |
| 2016/0173508 A1* | 6/2016 | Kozlovsky ......... H04L 63/1416 726/24 |
| 2017/0169217 A1 | 6/2017 | Rahaman et al. |
| 2017/0214708 A1 | 7/2017 | Gukal et al. |
| 2018/0004948 A1 | 1/2018 | Martin et al. |

OTHER PUBLICATIONS

S. Noel, E. Robertson and S. Jajodia, "Correlating intrusion events and building attack scenarios through attack graph distances," 20th Annual Computer Security Applications Conference, Tucson, AZ, USA, 2004, pp. 350-359. (Year: 2004).*

(Continued)

*Primary Examiner* — Theodore C Parsons
(74) *Attorney, Agent, or Firm* — M&B IP Analysts, LLC

(57) ABSTRACT

A method and system for matching event sequences for predictive detection of cyber-attacks are discussed. The method comprises receiving a reference event sequence and a query event sequence; converting the reference event sequence to a first step-value list and the query event sequence to a second step-value list; and matching the first and second step-value lists to identify at least one optimal common pattern.

13 Claims, 8 Drawing Sheets

(56) References Cited

OTHER PUBLICATIONS

W. Li, Li Zhi-tang and F. Jun, "Learning attack strategies through attack sequence mining method," 2006 International Conference on Communication Technology, Guilin, 2006, pp. 1-4. (Year: 2006).*
J. J. M. Molina, M. A. H. Ruíz, M. G. Pérez, G. M. Pérez and A. F. G. Skarmeta, "Event-Driven Architecture for Intrusion Detection Systems Based on Patterns," 2008 Second International Conference on Emerging Security Information, Systems and Technologies, Cap Esterel, 2008, pp. 391-396. (Year: 2008).*
D. Zhao, X. Zhu and T. Xu, "Improvement of algorithm for pattern matching in intrusion detection," 2013 5th IEEE International Conference on Broadband Network & Multimedia Technology, Guilin, 2013, pp. 281-284. (Year: 2013).*
SAM, Genome Analysis Wiki, What is Sam, last modified Sep. 11, 2015, URL: https://genome.sph.umich.edu/w/index.php?title=SAM&oldid=13726.
Sequence Alignment/Map Format Specification, The SAM/BAM Format Specification Working Group, URL: https://github.com/samtools/hts-specs, Jun. 1, 2017, pp. 1-16.
Smith-Waterman Algorithm, Wikipedia Definition, last edited: Aug. 12, 2017, Wikipedia Foundation, Inc.
String Metric, Wikipedia Definition, last edited: Jul. 19, 2017, Wikipedia Foundation, Inc.

* cited by examiner

US 10,735,439 B2

SYSTEM AND METHOD FOR ATTACK SEQUENCE MATCHING

CROSS-REFERENCE TO RELATED APPLICATIONS

This application claims the benefit of U.S. Provisional Application No. 62/383,837 filed on Sep. 6, 2016 and U.S. Provisional Application No. 62/428,161 filed Nov. 30, 2016, the contents of which are hereby incorporated by reference

TECHNICAL FIELD

This disclosure generally relates to implementation of security techniques for detecting cyber-attacks, and particularly to predictive detection of event sequences based on the processing of events.

BACKGROUND

A significant problem facing the Internet community is that online businesses and organizations are vulnerable to malicious attacks. Cyber-attacks have been executed using a wide arsenal of attack techniques and tools targeting both the information maintained by the online businesses and their IT infrastructures. Cyber-attacks typically aim to steal data, disable applications or services, or damage online assets of organizations.

The cyber-attacks attempt to exploit any potential vulnerability in systems and networks of an organization. For example, recently identified cyber-attacks have been executed using a combination of attack techniques at the network and application levels. Attackers use different attack tools to execute different attack techniques. Each such attack tool is designed to exploit weaknesses identified in one of the target's defense layers.

In order to protect their online assets, organizations have deployed a variety of security devices and services (collectively referred to as security devices or a security device). The security devices are selected to protect different segments of the networks and handle different types of cyber-attacks. For example, security devices can be utilized to detect intrusion attempts, malwares, bots, execute denial-of-service (DoS) attacks, HTTP or HTTPS flood attacks, attacks against web applications (e.g., XSS, SQL injection, session hijacking and buffer overflows), and so on.

Each such security device generates a high numbers of events. An event may include, for example, detection of an attack, breach of a security policy, detection of suspected behavior, and so on. Due to the high volume of security events, a security administrator in an organization cannot efficiently process and analyze the generated events. To ease the management of security events, security information and event management (SIEM) systems have been introduced. Such systems provide a holistic view of an organization's security device by gathering all events from the different devices and reporting the gathered events through a single interface. A SIEM system does not solve the problems related to the high volume of events to be analyzed, as the analysis and monitoring of events should still be performed by a user (e.g., a security administrator). As a result, only a small percentage of the total number of security events generated by the security devices is analyzed.

This relatively low percentage of analysis is a major drawback, as lack of such analysis often results in a high number of false positives, misdetection of attacks, inability to distinguish between critical and uncritical events, and misused investment of detection resources, and so on. Specifically, the lack of events analysis prevents detection of attacks before they occur or causes harm to protected objects of the organization.

Typically, a cyber-attack spans a sequence of actions which amount to an attack incident. The actions may be associated with different stages of the incident or different targets of the attack within an organization. Each stage or part of the attack may be identified and reported as events by a different security device deployed in the network.

As an example, a DDoS burst attack is a sequence of high traffic volumes communicated in bursts. A sequence of actions would include intermittent bursts of attack traffic and then pauses. As another example, a sequence of actions can begin with information gathering, continue with lateral movement, and end in data exfiltration. As yet another example, an attack can start with application scanning, followed by intrusion attempts, and then a DDoS attack.

Existing solutions include security devices that independently report events upon detection of such actions. However, the security devices cannot identify a pattern of an attack as they are not configured to analyze connections of events across different devices. As noted above, such analysis cannot be performed by an administrator due to the high volume of events. As such, cyber-attacks cannot be detected early or predicted. For example, identification of events related to application scanning that is part of an identified pattern can indicate an in-coming DDoS attack. However, current solutions cannot identify such attack patterns based on events and cannot predict cyber-attacks.

In addition, the high volume of events does not allow for accurate and real-time comparisons between sequences of events to identify matching patterns. Standard matching techniques such as a Fuzzy Hashing technique are inaccurate and inefficient in identifying patterns matching between sequence values.

Therefore, it would be advantageous to provide an efficient solution that would cure the deficiencies of existing security solutions.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Some embodiments disclosed herein include a method for matching event sequences for predictive detection of cyber-attacks. The method comprises receiving a reference event sequence and a query event sequence; converting the reference event sequence to a first step-value list and the query event sequence to a second step-value list; and matching the first and second step-value lists to identify at least one optimal common pattern.

Some embodiments disclosed herein include a system for A system for predictive detection of cyber-attacks. The comprising a processing circuitry; and a memory, the memory containing instructions that, when executed by the processing circuitry, configure the system to: receive reference event sequence and a query event sequence; convert the reference event sequence to a first step-value list and the query event sequence to a second step-value list; and match the first and second step-value lists to identify at least one optimal common pattern.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
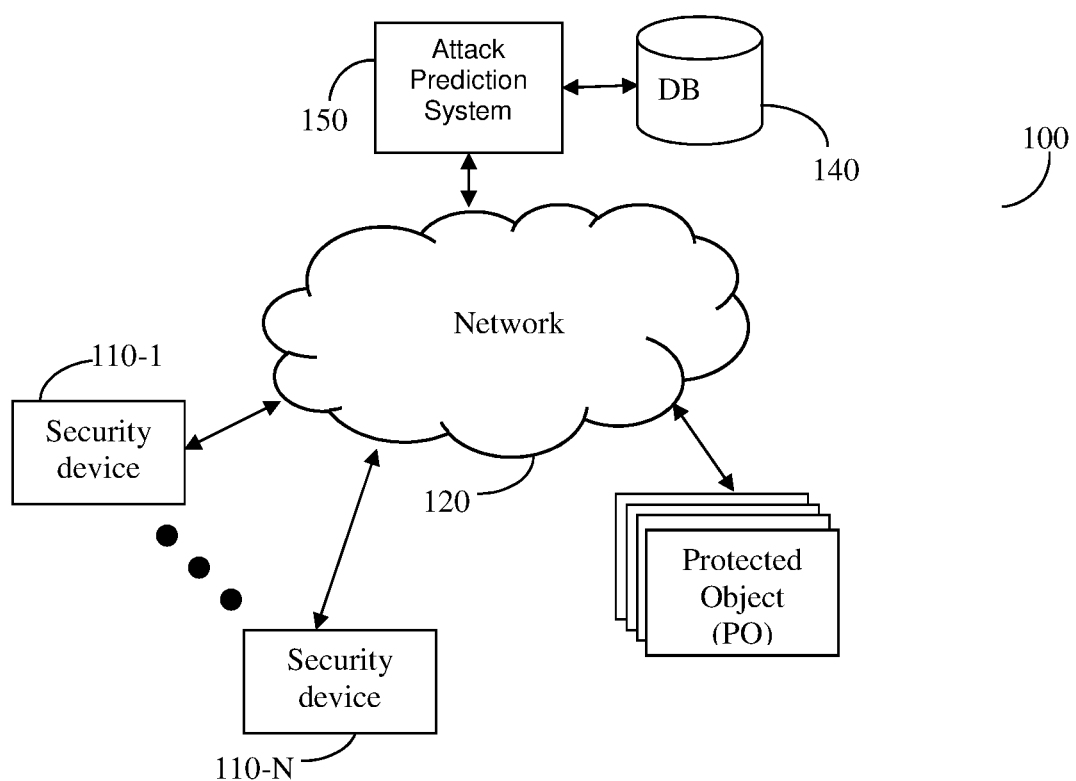
FIG. 1 illustrates a network system utilized to describe the various embodiments.

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 shows an example diagram 100 utilized to describe the various disclosed embodiments. The diagram 100 illustrates a typical deployment of security devices 110-1 through 110-N (hereinafter referred to individually as a security device 110 and collectively as security devices 110, merely for simplicity purposes) in an organization. The security devices 110 are connected a network 120 and configured to protect one or more protected objects (POs) 130 of the organization.

The protected objects 130 may be servers (e.g., web server, application servers, etc.), networks, network devices (e.g., routers, switches, etc.), client devices (e.g., desk-top computers, mobile devices, etc.), databases, applications, services, and so on.

The network 120 may, be for example, a local area network (LAN), a wide area network (WAN), the worldwide web (WWW), similar networks, and any combination thereof. It should be noted that the network 120 may include a combination of the different networks. The network 120 or portions thereof may be a virtual network, a software defined network (SDN), and the like.

A security device 110 is configured to defend a protected object 130, to detect or mitigate a particular type of cyber-attack, or both. Further, each security device 110 may be configured to detect or mitigate a different type of cyber-attack. As an example, a security device 110 may be a security detection system, such as an intrusion protection systems (IPS), a web application firewall (WAF), a network firewall, a database (DB) security system, a DoS/DDoS detection device, an endpoint security system (e.g., anti-virus software), and the like. A security device 110 may include a security information and event management (SIEM) system, an events management repository, and the like.

Each security device 110 can generate or gather events. An event can be generated upon, for example, detection of an attack, breach of a security policy, detection of suspected behavior, and so on. An event encapsulates information such as, but not limited to, device type and vendor, event type, event description, date, time, network addresses, and so on. Events generated by different security devices 110 may contain different pieces of information, may be realized in a different format, or both. In an embodiment, the events provided by the different security devices 110 are stored in a database 140 communicatively connected to the network 120.

According to the disclosed embodiments, an attack prediction system 150 is also communicatively connected to the network 120 and configured to perform the various disclosed embodiments for predictive cyber-attack detection. Specifically, the attack prediction system 150 is configured to analyze events to generate sequences of events (hereinafter "event sequences" or an "event sequence"). The attack prediction system 150 is further configured to identify patterns that may be cyber-attack patterns. Upon detection of a cyber-attack pattern, one or more mitigation actions can be executed for defense of the protected objects 130.

In an embodiment, the attack prediction system 150 is configured to operate in two modes: learning and prediction. In the learning mode, events are processed to generate events sequences. The generated events sequences are further processed to identify cyber-attack patterns, and for each such pattern a quality score is computed (hereinafter a "pattern score"). The learning may be performed based on events gathered or received from the security devices 110 (or both) and may be stored in the database 140. It should be noted that events in the database 140 may be gathered from events learnt in other environments, other customers, and/or injected manually to the database.

In an embodiment, the system 150 is configured to identify events sequences which have been developed in time around at least a main fixed feature (or just fixed feature). The fixed feature defines a context for creating a sequence of events. The fixed feature can be, for example, a source IP address of an attacker computer, a destination address of a protected object, a host name, or any other field in the event. In another embodiment, the system 150 is configured to identify events sequences which develops in time around a variable feature which defines a step between different stages in the pattern. For example, an attack name is the step.

In an embodiment, the system 150 is further configured to compute events sequences for each fixed feature in order to identify patterns having similar behavior. The similar behavior may indicate legitimate or malicious behavior. Patterns representing malicious behavior are saved to be utilized in the prediction mode of operation. In an embodiment, the comparison between two events sequences is performed using a sequence alignment process. In an example implementation, the sequence alignment process is discussed in greater detail below with reference to FIG. 7-8.

In the prediction mode, the attack prediction system 150 is configured to update event sequences based on incoming events, and to compare the updated sequences to the attack patterns identified during the learning mode. If an updated sequence matches a pattern, the attack prediction system 150 is configured to determine a risk score. A risk score above a predefined threshold may indicate an on-going or in-coming attack, i.e., detection of a current attack or an evolving attack. In an embodiment, a risk score is computed based on the percentage of fulfillment of the pattern, in the matched sequence alignment, the alignment gaps and the computed score for the pattern ("pattern score"). The processes performed during the prediction mode are discussed in greater detail below.

It should be further noted that the embodiments disclosed herein are not limited to the specific architecture illustrated in FIG. 1 and other architectures may be equally used without departing from the scope of the disclosed embodiments. Specifically, the attack prediction system 150 may reside in the cloud computing platform, a datacenter, on premise, and the like. Moreover, in an embodiment, there may be a plurality of attack prediction systems 150 operating as described hereinabove and configured to either have one as a standby proxy to take control in a case of failure, to share the load between them, or to split the functions between them.

Figure 2:
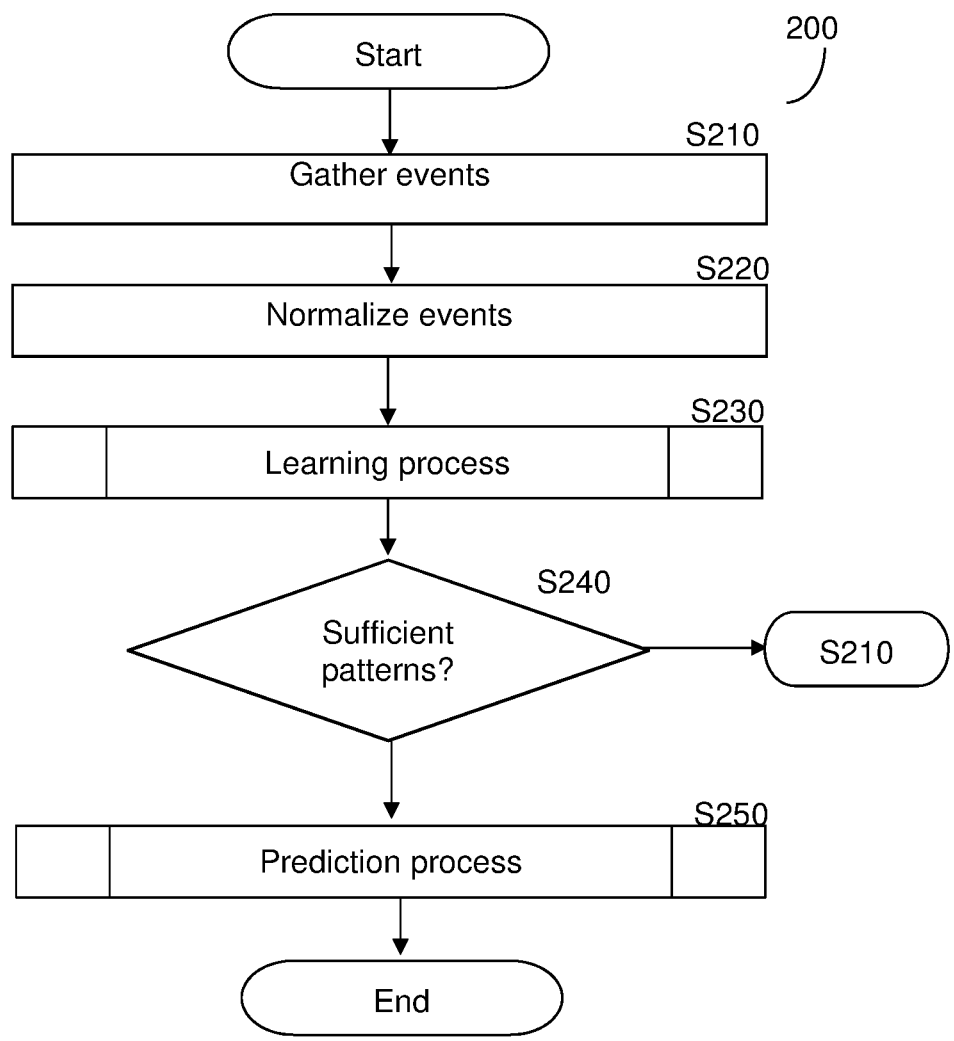
FIG. 2 is a flowchart illustrating a method predictive detection of cyber-attacks according to an embodiment.

FIG. 2 is an example flowchart 200 illustrating a method for a predictive detection of cyber-attacks according to an embodiment. In an embodiment, the method may be performed by the attack prediction system 150.

At S210, events are gathered or otherwise received. As noted above, the events may be sourced from security detection systems, event management systems, events management repositories, and the like. The events may be of a different format and may contain different information. The gathered or received events can be saved in a database.

At S220, the events are normalized into a normalized event structure. The normalized event structure includes a predefined set of data fields. Such a set may include mandatory and optional data fields. For example, mandatory data fields may include date and time that an event occurs, a device vendor, a device product, a device product version, an alert ID, an alert name, and a severity. The optional data fields may include a destination IP address, a destination port number, a source IP, a source port, a threat category, a protocol type, and so on. It should be noted that the contents of each field in the normalized event structure is based on the values of the respective events. Such contents are also normalized to a unified format.

At S230, a learning process for generating event sequences and identifying at least cyber-attack patterns based on events sequences is performed. The learning process is described in greater detail herein below with reference to FIG. 3. In an embodiment, pre-learnt patterns can be received from external resources and/or previous processes. If there are sufficient cyber-attack patterns, then S230 is not performed.

At S240, it is checked if the learning process has identified sufficient cyber-attack patterns that can be utilized in the predictive mode and, if so, execution continues with S250; otherwise, execution returns to S210. The number of attack patterns sufficient to transition into a prediction mode is preconfigured and may be related to a specific type of attack. For example, a DDoS attack may require fewer learned cyber-attack patterns than a malware propagation type of attack. It should be noted that the learning process can continue in parallel to the prediction process to identify more cyber-attack patterns.

At S250, based on newly received events and the identified attack patterns, an attempt is made to predict cyber-attacks against one or more protected objects in the organization. In an embodiment, S250 includes updating a sequence based on the newly received events, and comparing the updated sequence to the identified attack patterns. In an embodiment, S250 further includes, upon identifying a match, computing a risk score and executing one or mitigation actions based, in part, on the computed risk score. The prediction process of S250 is described in greater detail herein below with reference to FIG. 5.

Figure 3:
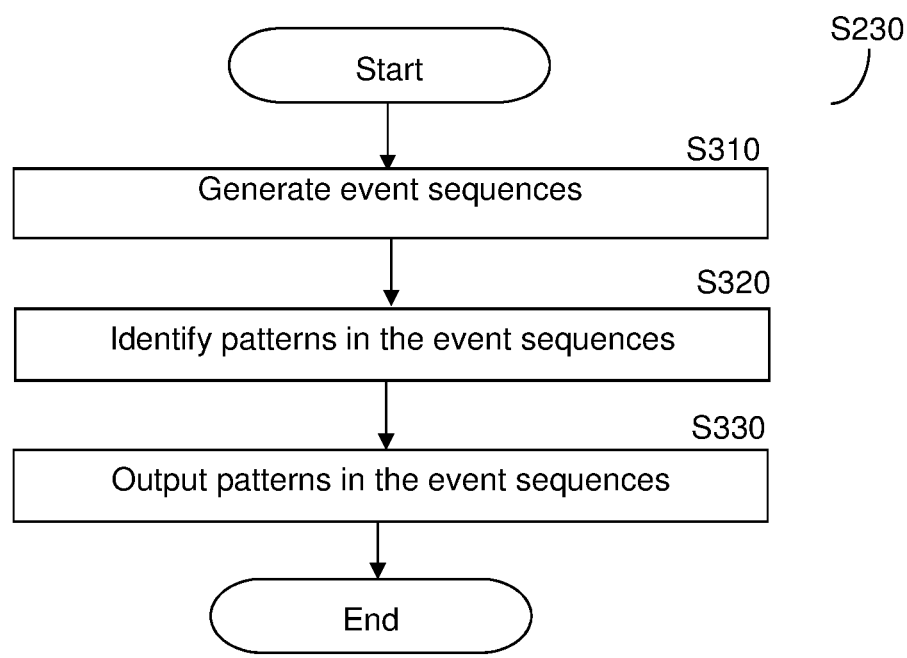
FIG. 3 is a flowchart illustrating the learning process according to an embodiment.

FIG. 3 is an example flowchart S230 illustrating the learning process according to an embodiment. In order to the described the operation of S230, the following parameters will be defined: an event includes a set of features and occurs at a specific time; an event series is a chain of events within a Time Window; a Time Window is the time from start to end of a sequence of events; event features ($F_i$, i=1, . . . , N) are a set of values, normalized to a unified format; an event sequence is a set of events grouped into steps; and a step is a stage characterizing a meaningful transition within a sequence. This mechanism allows grouping of similar events to a single meaningful entity, which can represent, without limitation, a stage within an attack campaign. Each stage may contain one or more events of a certain similarity (for example, events of the same attack name can be grouped to a stage or events of the same category).

In an embodiment, the following constraints are also applied: $F_{fixed}$ is a fixed feature having a fixed value within a sequence. The fixed feature is used at the main context around which the in the sequence is created. The $F_{step}$ defines a transition between steps in each step. $Max_{time}$ is a maximum time difference from the first and last event in the sequence. $Max_{StageDuration}$ is a maximum time difference between the first and last event in a stage. $Max_{Length}$ is a maximum number of events which are included in an event sequence.

The goal of the learning process is to find at least one pattern based on at least two sequences containing fixed feature ($F_{fixed}$) and their transitional steps between $F_{step}$, where the constraints $Max_{time}$, $Max_{StageDuration}$ and $Max_{Length}$ apply. For each sequence of events, the probability of moving to a next step from a current step is determined, based on, matching results from the closest patterns. Thus, the output of the learning process is a list of event sequences representing one or more attack patterns, each attack pattern is associated with a pattern score indicating the number of originating sequences and their calculated score and the probability to step forward from each step to the next.

At S310, input events are processed to generate event sequences. In an embodiment, similar events are grouped into an event sequence. An event sequence may include one or move events. The grouping is of events received during a predefined Time Window. Further, each event sequence is further logically divided into steps.

A similarity of events is the number of identical features (e.g., but not limited to fields) between each two compared events. In an example embodiment, a measure to determine similarity is a Hamming distance, which is the number of different features between each two compared events. It should be noted that other several string distance functions can be used to measure the distance, such as Levenshtein, Jaro-Winkler, and the like. An example flowchart showing an embodiment for creating events sequences is provided in FIG. 4.

At S401, for each event being processed, the event is compared to the last event in an existing sequence (for each sequence) to compute a string distance, e.g., a Hamming distance. At S402, the computed Hamming distance is compared to a predefined minimum threshold. If the Hamming distance is greater than the predefined minimum threshold, then, at S403, it is checked if the Hamming distance is greater than a predefined maximum threshold; otherwise, execution continues with S405. If so, the event does match an existing sequence and, at S404, a new sequence is created and the event is added to the sequence. In addition, the new event will create a new step within the sequence. Otherwise, execution continues with S409.

If S402 results with a Yes answer, then, at S405, it is checked if the event's time occurs during a time window of the existing sequence. If so, execution continues with S404; otherwise, at S406, it is checked if the event's time occurs during a time limit of a step in the existing sequence. If so, at S407, a new step is created in the existing sequence and the event is added to the next step; otherwise, execution proceeds with S408, where the event is added to an existing step in the existing sequence.

If S403 results with a No answer, then at S409, it is checked if the event's time occurs during a Time Window of the existing sequence. If so, execution continues with S404; otherwise, execution continues with S407.

Figure 4:
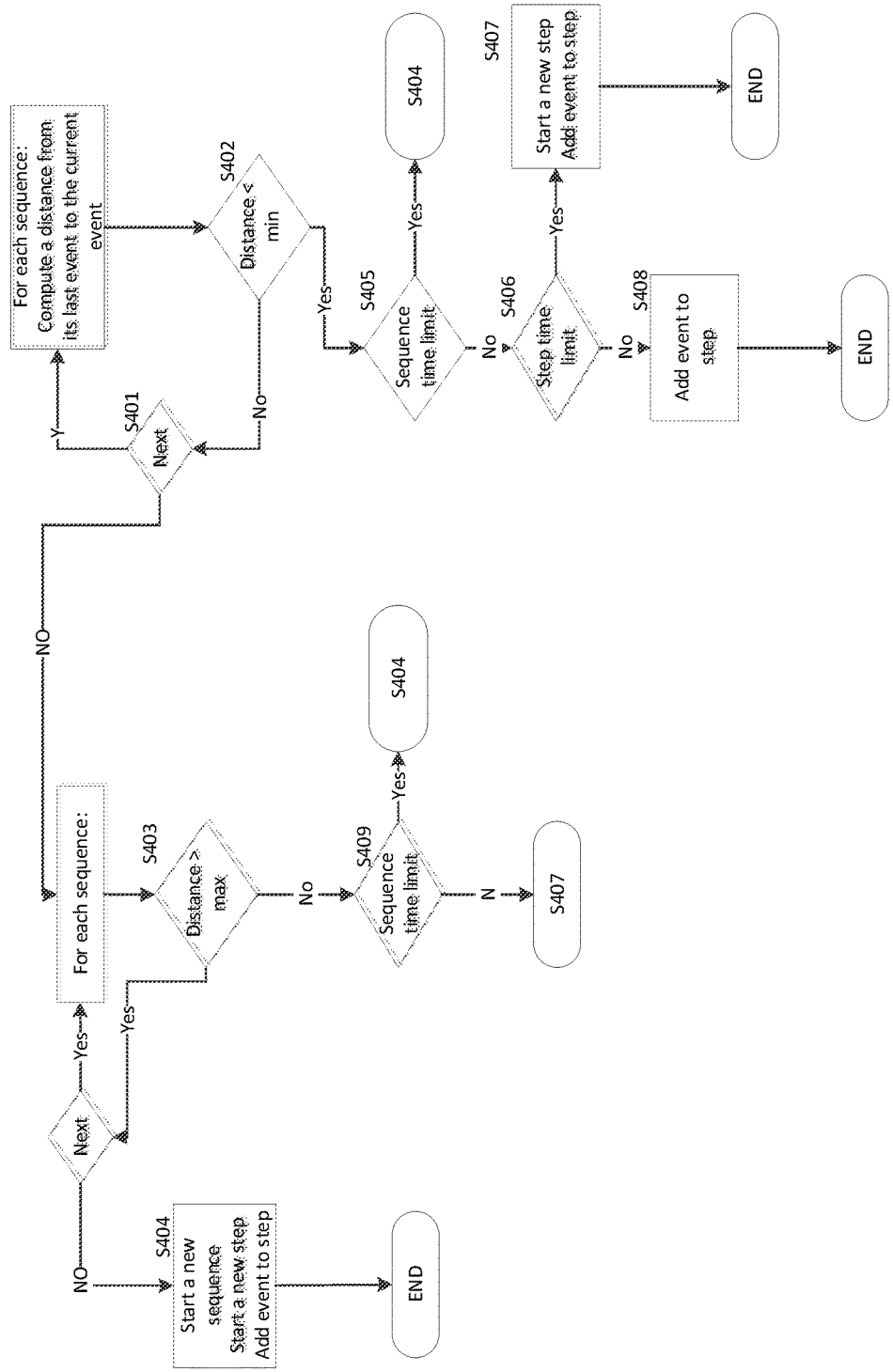
FIG. 4 is a flowchart illustrating a process for creating events sequences of events according to one embodiment.

It should be noted that the process described with reference to FIG. 4 runs on all events and all existing sequences. The output of the method is a list of events grouped into sequences and steps.

Returning to FIG. 3, at S320, every pair of event sequences in the list of sequences are compared to each other to identify patterns having similar behavior. In an embodiment, S320 includes listing, for each sequence, its fixed and step features (Ffixed and Fstep); comparing each fixed feature (Ffixed) of one sequence to Fstep of another sequence; identifying patterns of similar steps (based on the Ffixed and Fstep); and computing a pattern score for each identified pattern. Then a preconfigured number of patterns having the highest pattern scores are determined as the output cyber-attack patterns.

In an embodiment, the comparison between two event sequences for identifying patterns and their scores is based on a sequence alignment process. Typically, such a process includes aligning the string indexes in a way that maximizes a common possible pattern. The sequence alignment process takes into account the indices similarities, the indexes gaps, and a final weighted score. In another embodiment, S320 may include the sequence alignment matching process discussed herein below with respect to FIG. 7.

According to the disclosed embodiments, the alignment process is performed on the values of Fstep and Ffixed rather than on indexes. The features are encoded using unique labels to allow the alignment. The pattern score is an alignment score which is a function of the match length and the gap penalty. In an example embodiment, the match length is a number of consecutive Fstep that appear in both sequences, with the possible index gaps.

In another embodiment, S320 includes comparing (e.g., using a sequence alignment process) the list of sequences output at S310 to a sequence demonstrating known patterns. Any matching listed sequence will be associated with the known pattern. It should be noted that a sequence of a known pattern will be formatted as an event sequence generated at S310.

At S330, all identified patterns are output and saved in a database to be used during the prediction process. In certain embodiments, additional patterns representing known patterns of malicious behavior are saved in the database as cyber-attack patterns.

Figure 5:
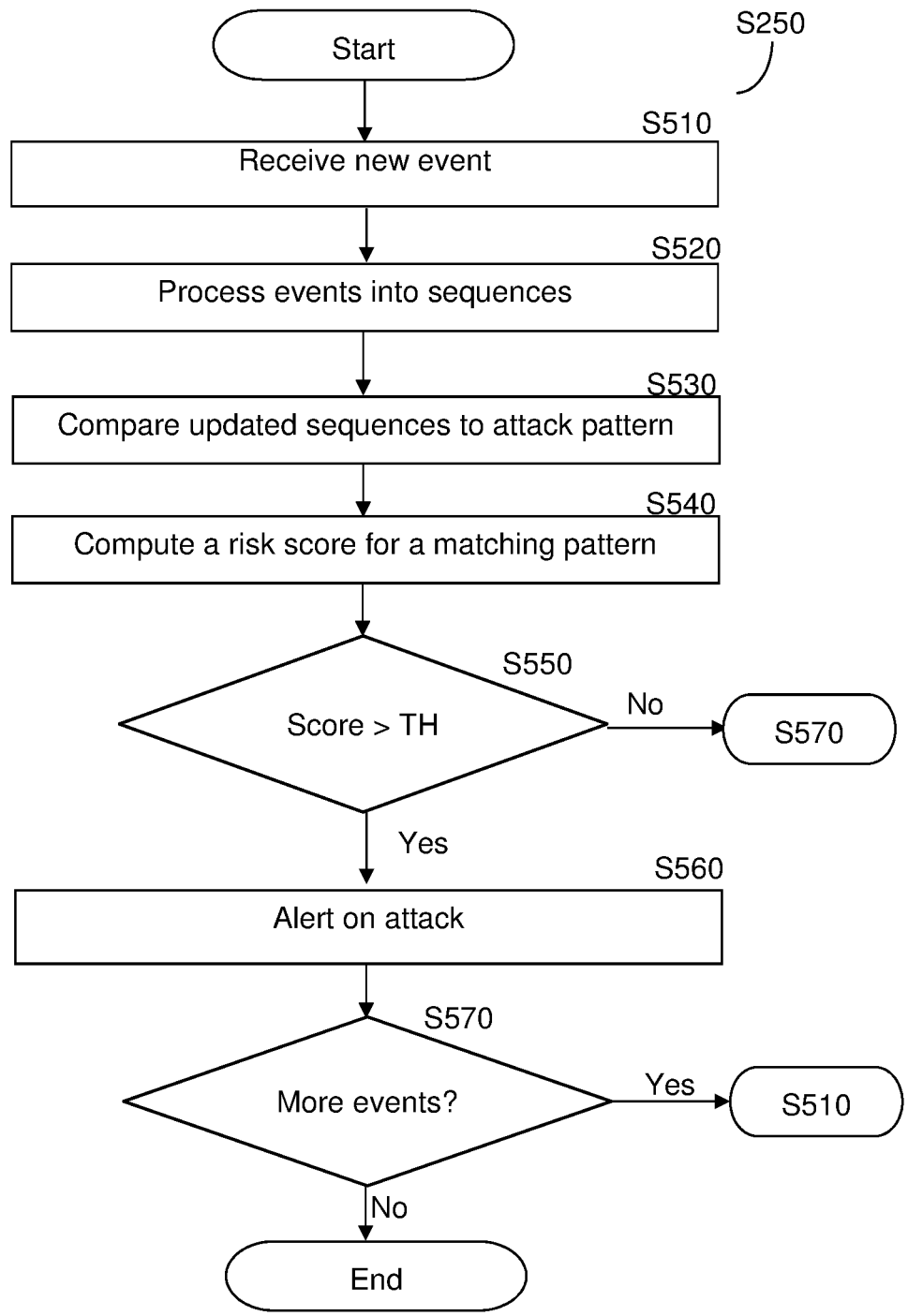
FIG. 5 is a flowchart illustrating the prediction process according to an embodiment.

FIG. 5 is an example flowchart S250 illustrating the predicting process for predicting cyber-attacks based on identified attack patterns according to an embodiment. At S510, a new event is received. The event may be input by at least any of the systems mentioned above.

At S520, the new event is matched to any event sequence created during the learning process in order to update any such sequence. In an embodiment, S520 can be performed using the sequencing process described in FIG. 4.

At S530, any updated sequences of events, new sequences of events, or a combination thereof, created in response to the matching performed at S520 is compared to the identified attack patterns. In an embodiment, the comparison at S530 can be performed using a sequence alignment process discussed above. In a further embodiment, S530 may further include the sequence alignment process described further herein below with respect to FIG. 7

At S540, for each matching pattern, a risk score is computed. The risk score is a function of a population level, the pattern-match score and the pattern score (computed for the pattern during the pattern identification process). The population level is based on the progress within the pattern. For example, if the attack pattern is a burst DDoS and the new event is for first identified burst, then the population level will be low.

At S550, it is checked if the risk score is above a predefined threshold. If so, execution continues with S560, at which an alert is generated; otherwise, execution terminates. Alternatively or collectively, S560 may include activating one more mitigation actions. The mitigation action to be activated is based in part on the fixed feature ($F_{fixed}$) of the attack pattern. For example, one action is suspending a host source generating the traffic when the $F_{fixed}$ of the identified attack pattern is a source IP address. As another example, one action is applying a primitive mitigation (e.g., blacklist) when the $F_{fixed}$ of the identified attack pattern is a source IP address. In yet another example, the preemptive mitigation action may be applied when the $F_{fixed}$ of the identified attack pattern is a destination IP address. In yet another example, a mitigation action may be changing policies when the $F_{fixed}$ of the identified attack pattern is a host name.

At S570, it is checked if more events have been received and, if so, execution continues with S510; otherwise, execution terminates.

Figure 6:
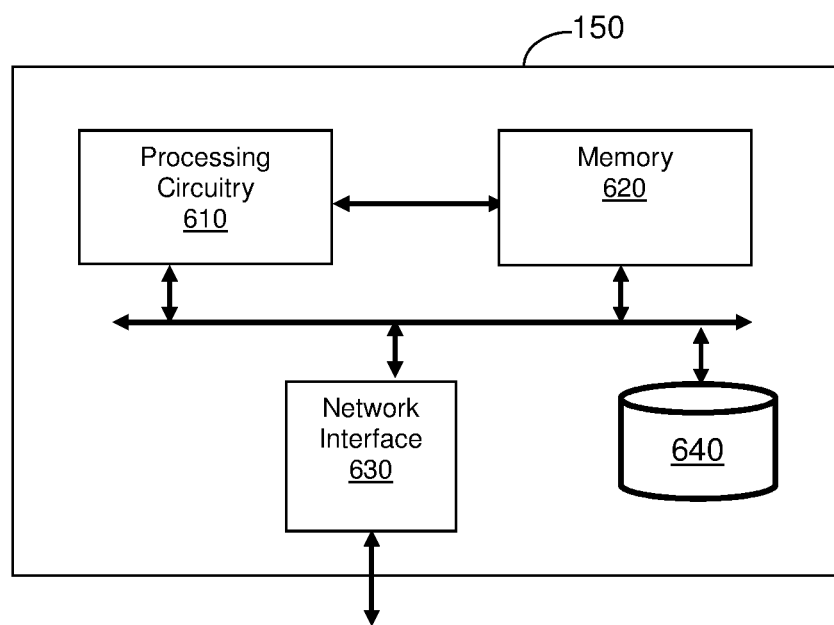
FIG. 6 is a block diagram of a predictive detection system configured to carry the disclosed embodiments.

FIG. 6 shows an example block diagram of the attack prediction system 150 constructed according to one embodiment. The attack prediction system 150 includes a processing circuitry 610 coupled to a memory 620, a network interface 630, and a storage 640.

The network interface 630 is configured to allow the communication with at least a plurality of security devices (e.g., devices 110) and protected objects 130. The processing circuitry 610 may comprise, or be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing circuitry 610 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing unit, cause the processing unit to perform the various functions.

The memory 620 may comprise volatile memory components, non-volatile memory components, or both, including but not limited to static random access memory (SRAM), dynamic random access memory (SRAM), Flash memory, magnetic memory and other tangible media on which data, instructions, or both may be stored. The memory 620 may contain instructions that, when executed by the processing circuitry 610, performs, for example and without limitations, the processes for detecting headless browsers and generating challenges as described in more detail in above.

The storage 640 may be configured to store event sequences, identified attack patterns and their respective pattern scores, events gathered from other systems, or a combination thereof. In an embodiment, the storage 640 also maintains a plurality of dictionaries. As discussed in detailed below, a dictionary provides a 2-way mapping of a data field value to a unichar. The storage 640 may be realized as a magnetic storage, optical storage, and the like, and may be realized, for example, as flash memory or other memory technology, CD-ROM, in-memory DB technologies, Digital Versatile Disks (DVDs), or any other medium which can be used to store the desired information.

Figure 7:
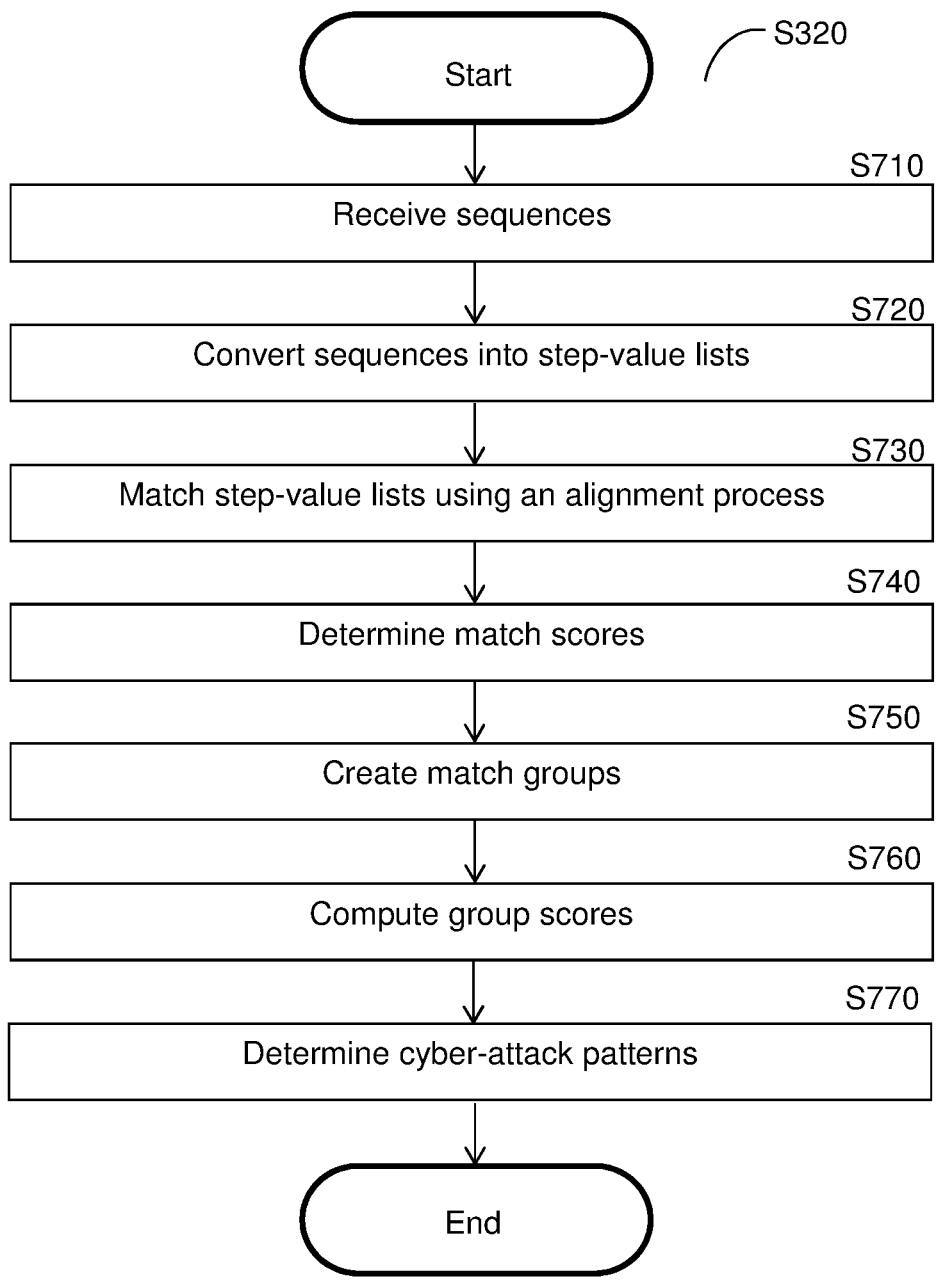
FIG. 7 is a flowchart illustrating a method for event sequence matching according to an embodiment.

FIG. 7 is an example flowchart S320 illustrating a method for sequence matching according to an embodiment. In an embodiment, the matching is between a reference sequence and a query sequence. In an embodiment, the query sequence may be an event sequence generated based on security events as described further herein above with respect to FIGS. 3 and 4. The reference event sequence may be an event sequence representing or including a known attack pattern. The query sequence is compared to the reference sequence to identify common pattern's steps and, consequently, potential cyber-attacks. It should be noted that the matching of FIG. 7 may be performed between a query sequence and one or more reference sequences. In an embodiment, the process described herein with respect to FIG. 7 is performed by the attack prediction system 150.

At S710, a query sequence and one or more reference event sequences are received. A sequence (query or reference) includes fixed and step features. A fixed feature ($F_{fixed}$), discussed above, has a fixed value within the sequence. As further discussed herein above, a step feature ($F_{step}$) defines a transition between steps in each sub-sequence of the sequence. Each step feature is associated with a fixed feature.

At S720, each sequence is converted into a step-value list. In an example embodiment, the conversion is performed by converting each step feature ($F_{step}$) value, per each fixed feature ($F_{fixed}$), in a sequence to an encoded value. In an example, embodiment, the encoded value is a Unicode® character (unichar). Such encoding allows for mapping of the features' values in a sequence to a large number (e.g., about 1 million) of different characters (unichars) and for performance of the alignment process on such characters. For example, if a sequence includes the following step-values:

$IP1 => IP2 => IP1$

The step-value list may be a sequence of unichars represented as follows:

$\beta -> \alpha -> \beta$

It should be noted that the encoding is based on the specific values of a feature. As an example, the sequence including source IP addresses $<<192.168.0.1 => 192.168.1.1 => 192.168.0.1>>$ may be encoded into a step-value list: $<<\alpha, \beta, \alpha>>$.

In another embodiment, the encoding is performed using one or more dictionaries. Each dictionary is associated with a data field (or feature), such as a source IP address, a destination IP address, and so on. If a dictionary does not include an entry for a specific value, then the encoding is added (lazy initialization) on-the-fly. The dictionary further allows for reverse-decoding the unichars back to their respective values, once the alignment is completed. The following is an example dictionary of a source IP address:

TABLE 1

| IP address | Unichar |
|---|---|
| 162.243.10.163 | β |
| 17.249.59.11 | α |
| 47.89.41.164 | Δ |
| 159.203.135.236 | ω |
| 104.236.59.154 | Θ |
| 172.245.29.54 | ε |
| 198.58.120.206 | μ |
| 104.131.165.109 | Þ |

At S730, the step-value lists are matched to each other. Every matched pair of step-value lists provides a matching pattern and a score for the matching. Each pattern, in an embodiment, is a string of unichars in the same order as they appear in their respective matched step-value lists.

In an embodiment, the matching between a pair of step-value lists may be performed based on a sequence alignment algorithm such as, but not limited to, the Smith-Waterman algorithm for local sequence alignment, a global sequence alignment algorithm, and the like. The alignment process performed, according to an embodiment, is designed to compare (through an alignment) two step-value lists to identify the optimal common pattern between them. For example, for the following lists:

List 1 $<<\beta\alpha\Delta\omega\Theta>>$

List 2 $<<\beta\alpha\epsilon\mu\Delta\omega>>$

The optimal common pattern would be:

$<<\beta\alpha\Delta\omega>>$

Figure 8:
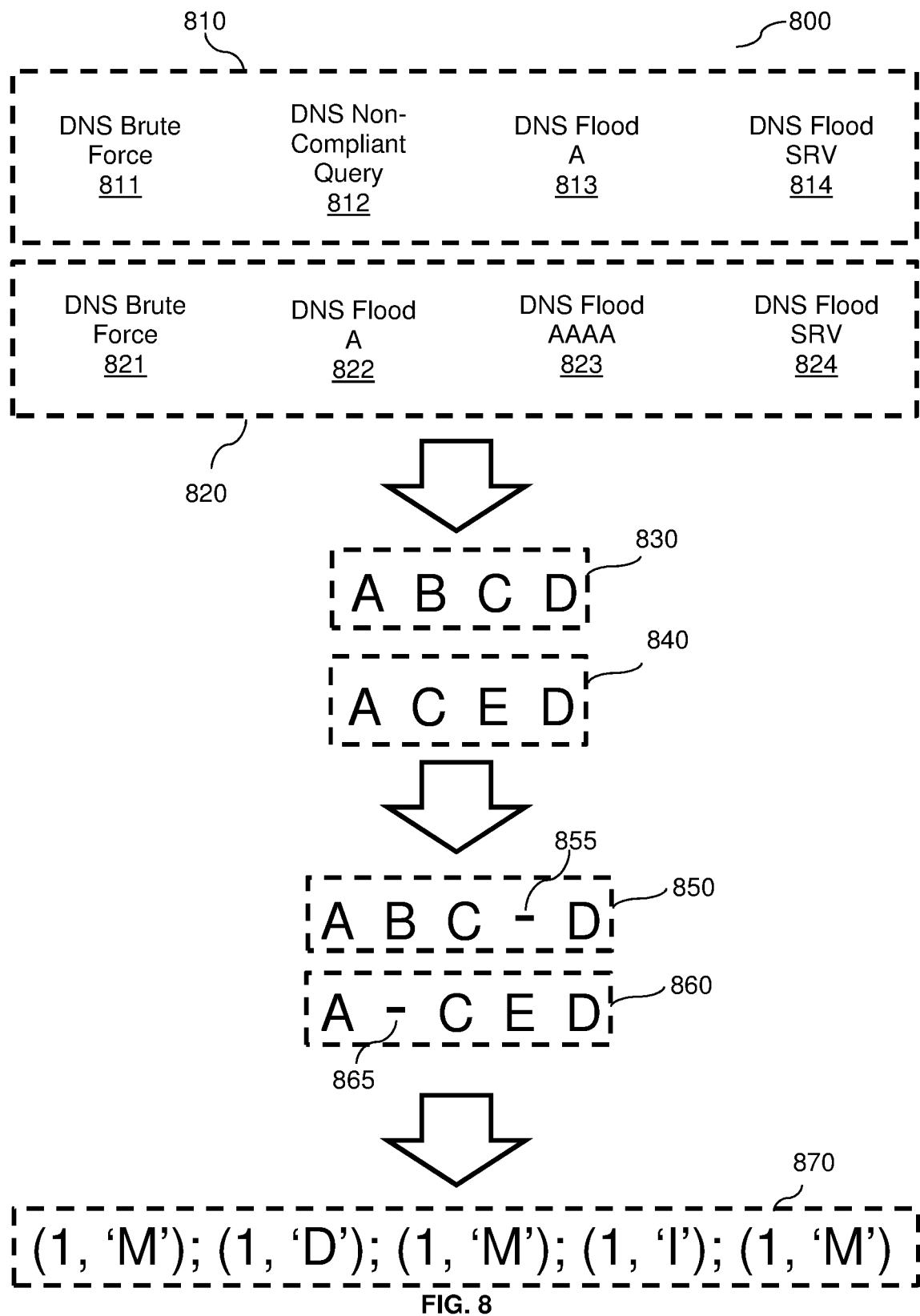
FIG. 8 is an example sequence diagram utilized to illustrate the sequence matching implemented according to an embodiment.

The sequence alignment process performed according to an embodiment is further demonstrated in FIG. 8.

At S740, a match score is determined for the output optimal common patterns (between a pair of lists). The match score may be determined based on, but not limited to, matching characters, provided gaps, or both. Specifically, in an example embodiment, the match score may be computed as a function of a number of matching characters (unichars) and a number and length of gaps or other mismatches.

A longer gap represents a lower quality match, thus the common pattern is less optimal. In a further example embodiment, substitutions may be disregarded for purposes of computing the match score. As a non-limiting example, the match score may be computed as:

$$S_{MATCH}=B*(N_{MATCH\_CHARS})-A*(N_{GAPS}) \qquad \text{Equation 1;}$$

Or $$S_{MATCH}=B*(N_{MATCH\_CHARS})+A*(N_{GAPS}) \qquad \text{Equation 2;}$$

where $S_{MATCH}$ is the matching score, $N_{MATCH\_CHARS}$ parameter is the number of characters that match in the compared strings, $N_{GAPS}$ is the number of gaps provided in alignment, and B is a constant value that may be set to a predefined integer value (e.g., 2). A is a constant negative or positive value. The operation sign '−' or '+' is opposite to the value of the "A", that is, when A is negative the sign is '+' and when A is positive the sign is '−'. In a non-limiting embodiment, determining the match score may be further based on the positions and the distances of the mismatches.

The alignment process may result in an optimal common pattern (of unichars) and a match score ($S_{MATCH}$) for each pair of matching step-value lists.

At S750, a match group is created by aggregation of optimal common patterns output by the alignment process. In an embodiment, the match group includes an aggregation of matches having the same pattern, but with a possible different match score ($S_{MATCH}$) over a predefined threshold. As noted above, the match score further includes fixed feature ($F_{fixed}$) and step ($F_{step}$) features. Such features are obtained by decoding the unichars to their respective values as maintained in the dictionary. For example, if a match group includes the optimal pattern of:

match group <<pattern=<<βαΔωμ>>>>

The decoding of that match group using the dictionary of Table 1 would result in a group including the features of:

match group<<pattern=<<162.243.10.163;
17.249.59.11; 47.89.41.164; 159.203.135.236;
198.58.120.206>>

At S760, a group score is computed for each match group. In an embodiment, the group score is a function of the match score ($S_{MATCH}$) of each of the members (optimal common patterns) in the group and the number of members. As a non-limiting example, the match score of a group $S_{GROUP}$ may be computed as:

$$S_{GROUP}=\text{avg}(S_{MATCH}(i))*p; \qquad \text{Equation 2}$$

Where, 'p' is the number of members, and $S_{MATCH}$ (i) is the respective member score for 1=1, . . . p. In another embodiment, the $S_{GROUP}$ may be a function of the length of the pattern.

At S770, based on the determined group match scores, a cyber-attack pattern is determined. In an embodiment, the cyber-attack pattern may be a predetermined number of match groups with the highest group scores among all identified match group. In another embodiment, only match groups having match scores above a predetermined threshold may be determined as output cyber-attack patterns.

FIG. 8 illustrates an example feature comparison between sequences using sequence alignment discussed with reference to FIG. 7. A reference sequence 810 and a query sequence 820 are compared. The reference sequence 810 includes a list of step features 811 through 814 related to a fixed feature of a particular destination IP address (e.g., "192.168.1.1"). The query sequence 820 includes a list of step-features 821 through 824 related to the same fixed feature destination IP address.

The sequences 810 and 820 are encoded (translated), based on a dictionary to unichars. For example, the feature "DNS Brute Force" is translated to a unichar "A", the feature "DNS Flood A" is translated to the unichar "C", the feature "DNS Flood AAAA" is translated to the unichar "E", and the feature "DNS Flood SRV" is translated to the unichar "D". The result is step-value lists 830 and 840, respectively.

The unichars of the step-value lists 830 and 840 correspond to the step features 811 through 814 and 821 through 824, respectively. The encoded step-value lists 830 and 840 are aligned to create aligned strings 850 and 860, respectively. Specifically, the aligned strings 850 and 860 include gaps utilized for marking differences between the aligned strings 850 and 960. In the example shown in FIG. 8, the aligned string 850 includes one gap 855, and the aligned string 860 includes one gap 865.

Based on the aligned strings 850 and 860, a matching indicator string 870 is generated. In the example shown in FIG. 8, the matching indicator string 870 is using the CIGAR format "(1, 'M'); (1, D'); (1, 'M'); (1, 'I'); (1, 'M'),"  where '(1, 'M')' indicates that one (1) characters matches, '(1, 'D')' indicates that one (1) character is deleted from the reference string 850 (i.e., the aligned string of the reference sequence 810), and '(1, 'I')' indicates that one (1) character is inserted into the reference string 850 (i.e., the aligned string of the reference sequence 810).

It should be appreciated that the CIGAR format is only one example for aligning the strings and other alignment formats can be used without departing from the scope of the disclosed embodiments.

A match score is determined based on the matching indicator string 870. In the example shown in FIG. 8, the match score for the compared sub-sequences is calculated as:

2*(3 matched unichars)−1*(2 missing unichars)=4.

That is, the score is computed based on the matched unichars ('A', 'C' and 'D') and missing unichars ('B' and 'E'). It should be noted that score can be computed using functions, other than those shown above.

The various embodiments disclosed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the disclosed embodiments and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for matching event sequences for predictive detection of cyber-attacks, comprising:
   receiving a reference event sequence and a query event sequence;
   converting the reference event sequence to a first step-value list and the query event sequence to a second step-value list;
   matching the first and second step-value lists to identify at least one optimal common pattern;
   comparing the query event sequence to each of the reference event sequence to result in at least one matched attack pattern;
   for each matched attack pattern, computing a risk score potentially indicating a cyber-attack, wherein the risk score is based on a population level determining a progress within the attack pattern; and
   causing execution of a mitigation action based on the risk score;
   wherein each of the reference event sequence, and the query event sequence, includes a group of similar security events, wherein similarity of events is determined based on at least one of a number of identical features between each compared event, having a same attack name, and being of a same category;
   wherein each of the reference event sequence, and the query event sequence, are defined, respectively, by at least a fixed feature having a fixed value within said event sequence and a step feature defining a transition between steps in each said sequence; and
   wherein each of the reference event sequence includes at one least previously identified attack pattern, and wherein the query event sequence is an event sequence generated by matching incoming received security event to a plurality of previously generated event sequences.

2. The method of claim 1, further comprising:
   determining a match score for each of the at least one optimal common pattern;
   creating at least one match group by aggregating optimal common patterns having match scores over a predefined threshold; and
   computing a group score for each of the at least one match group.

3. The method of claim 2, wherein the match group having a highest group score is indicative of a cyber-attack pattern.

4. The method of claim 1, wherein converting each of the reference event sequence and the query event sequence further comprises:
   converting each step feature value, per each fixed feature, in an event sequence to an encoded value.

5. The method of claim 4, wherein the encoded value includes a Unicode character.

6. The method of claim 4, further comprising:
   converting each encoded value in the match group to its encoded feature.

7. A non-transitory computer readable medium having stored thereon instructions for causing a processing circuitry to execute a process for matching event sequences for predictive detection of cyber-attacks, the process comprising:
   receiving a reference event sequence and a query event sequence;
   converting the reference event sequence to a first step-value list and the query event sequence to a second step-value list;
   matching the first and second step-value lists to identify at least one optimal common pattern;
   comparing the query event sequence to each of the reference event sequence to result in at least one matched attack pattern;
   for each matched attack pattern, computing a risk score potentially indicating a cyber-attack, wherein the risk score is based on a population level determining a progress within the attack pattern; and
   causing execution of a mitigation action based on the risk score;
   wherein each of the reference event sequence, and the query event sequence, includes a group of similar security events, wherein similarity of events is determined based on at least one of a number of identical features between each compared event, having a same attack name, and being of a same category;
   wherein each of the reference event sequence, and the query event sequence, are defined, respectively, by at least a fixed feature having a fixed value within said event sequence and a step feature defining a transition between steps in each said sequence; and
   wherein each of the reference event sequence includes at one least previously identified attack pattern, and wherein the query event sequence is an event sequence generated by matching incoming received security event to a plurality of previously generated event sequences.

8. A system for predictive detection of cyber-attacks, comprising:
   a processing circuitry; and
   a memory, the memory containing instructions that, when executed by the processing circuitry, configure the system to:
   receive reference event sequence and a query event sequence;
   convert the reference event sequence to a first step-value list and the query event sequence to a second step-value list;
   match the first and second step-value lists to identify at least one optimal common pattern;
   compare the query event sequence to each of the reference event sequence to result in at least one matched attack pattern;
   for each matched attack pattern, compute a risk score potentially indicating a cyber-attack, wherein the risk score is based on a population level determining a progress within the attack pattern; and
   cause execution of a mitigation action based on the risk score;
   wherein each of the reference event sequence, and the query event sequence, includes a group of similar security events, wherein similarity of events is determined based on at least one of a number of identical features between each compared event, having a same attack name, and being of a same category;
   wherein each of the reference event sequence, and the query event sequence, are defined, respectively, by at least a fixed feature having a fixed value within said event sequence and a step feature defining a transition between steps in each said sequence; and wherein each of the reference event sequence includes at one least previously identified attack pattern, and wherein the query event sequence is an event sequence generated by matching incoming received security event to a plurality of previously generated event sequences.

9. The system of claim 8, wherein the system is further configured to:
   determining a match score for each of the at least one optimal common pattern;
   creating at least one match group by aggregating optimal common patterns having match scores over a predefined threshold; and
   computing a group score for each of the at least one match group.

10. The system of claim 9, wherein the match group having a highest group score is indicative of a cyber-attack pattern.

11. The system of claim 8, wherein converting each of the reference event sequence and the query event sequence further comprises:
   converting each step feature value, per each fixed feature, in an event sequence to an encoded value.

12. The system of claim 11, wherein the encoded value includes a Unicode character.

13. The system of claim 11, wherein the system is further configured to:
   convert each encoded value in the match group to its encoded feature.

\* \* \* \* \*